(12) United States Patent
Park et al.

(10) Patent No.: US 8,548,096 B2
(45) Date of Patent: Oct. 1, 2013

(54) CONTROLLABLE FREQUENCY OFFSET FOR INPHASE AND QUADRATURE (IQ) IMBALANCE ESTIMATION

(75) Inventors: Chester Park, Santa Clara, CA (US); Jim Svensson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 358 days.

(21) Appl. No.: 12/983,006

(22) Filed: Dec. 31, 2010

(65) Prior Publication Data

US 2012/0170629 A1 Jul. 5, 2012

(51) Int. Cl.
- *H04L 27/38* (2006.01)
- *H04L 27/14* (2006.01)
- *H04L 23/00* (2006.01)

(52) U.S. Cl.
USPC ............ 375/316; 375/326; 375/344; 375/377

(58) Field of Classification Search
USPC ................. 375/260, 261, 267, 316, 326, 347, 375/279, 329, 340, 344, 377; 455/130, 132; 329/307, 308, 309
See application file for complete search history.

(56) References Cited

U.S. PATENT DOCUMENTS

| | | | | |
|---|---|---|---|---|
| 7,782,968 B2 * | 8/2010 | Yu et al. | | 375/260 |
| 7,957,476 B2 * | 6/2011 | Sanada et al. | | 375/260 |
| 8,320,858 B2 * | 11/2012 | Ruelke et al. | | 455/130 |
| 8,331,506 B2 * | 12/2012 | Park et al. | | 375/346 |
| 8,355,472 B2 * | 1/2013 | Conrad et al. | | 375/343 |
| 2004/0203472 A1 * | 10/2004 | Chien | | 455/68 |
| 2005/0276354 A1 * | 12/2005 | Su et al. | | 375/326 |
| 2009/0016376 A1 * | 1/2009 | Sawai | | 370/465 |
| 2009/0325516 A1 | 12/2009 | Safavi | | |
| 2010/0107042 A1 * | 4/2010 | Sawai et al. | | 370/465 |
| 2011/0019782 A1 * | 1/2011 | Kobayashi et al. | | 375/344 |
| 2011/0222638 A1 * | 9/2011 | Park et al. | | 375/346 |

FOREIGN PATENT DOCUMENTS

WO WO 2011076488 A1 * 6/2011

* cited by examiner

*Primary Examiner* — Tesfaldet Bocure
(74) *Attorney, Agent, or Firm* — Blakely Sokoloff Taylor & Zafman LLP

(57) ABSTRACT

Embodiments of user equipment and methods for determining IQ imbalance parameters are described. In some embodiments, a method for determining in-phase (I) and Quadrature (Q) imbalance (IQ imbalance) parameters based on a known signal in a dual-carrier receiver using at least one controllable frequency offset includes receiving a known signal modulated onto a first radio frequency (RF) carrier frequency and a second RF carrier frequency different than the first RF carrier frequency; downconverting the known signal to a baseband signal for the first and second carriers by conversion from the respective RF carrier frequencies to an intermediate frequency (IF) using a common RF local oscillator (LO) and by further conversion from IF to baseband using carrier specific IF LOs, wherein as a controllable frequency offset is used as a part of the conversion from at least one of RF to IF and IF to baseband through the LOs; removing any controllable frequency offset from the baseband signal for the first and second carriers to produce representations of the received signals of the first and second carriers; and deriving IQ imbalance parameters for each representation of the received signals of the first and second carriers using a least square estimate.

16 Claims, 8 Drawing Sheets

CONTROLLABLE FREQUENCY OFFSET FOR INPHASE AND QUADRATURE (IQ) IMBALANCE ESTIMATION

FIELD OF THE INVENTION

The present invention relates generally to wireless communications and in particular to apparatuses and methods for in-phase (I) and quadrature (Q) imbalance parameter estimation.

BACKGROUND

When it comes to orthogonal frequency-division multiplexing (OFDM) systems, IQ imbalance is considered as one of the major impairment sources inside terminal radios. More attention should be paid to IQ imbalance, when direct conversion receiver (DCR) is not applicable. This may occur, for example, in carrier aggregation (CA) (especially, intra-band non-contiguous CA).

CA is being considered for the 3rd Generation Partnership Project (3GPP). In particular, the Long Term Evolution (LTE)-Advanced project considers intra-band non-contiguous CA where multiple carriers are separately placed within a band. Generally, there are two prominent radio architectures for user equipment (UE) being used for this purpose: DCRs and double conversion receivers. These two radio architectures each have their own pros and cons. A double conversion receiver enables a cost-efficient and hardware-efficient implementation, since multiple carriers may share the RF mixing stage and (part of) the IF mixing stage. However, one drawback of a double conversion receiver is that it is more susceptible to IQ imbalance. In essence, double conversion receiver requires a more balanced radio design at the expense of a more cost-efficient and hardware-efficient implementation.

IQ imbalance comes from imbalanced RF/analog circuitry, which includes local oscillators (LOs), mixers, filters, ADCs, etc. RF/analog circuitry may be calibrated by controlling some circuit parameters or the IQ imbalance may be compensated by digital signal processing inside digital baseband.

SUMMARY

According to one or more embodiments disclosed and claimed herein, a method for determining in-phase (I) and Quadrature (Q) imbalance (IQ imbalance) parameters based on a known signal in a dual-carrier receiver using at least one controllable frequency offset, the method comprising: receiving a known signal modulated onto a first radio frequency (RF) carrier frequency and a second RF carrier frequency different than the first RF carrier frequency; downconverting the known signal to a baseband signal for the first and second carriers by conversion from the respective RF carrier frequencies to an intermediate frequency (IF) using a common RF local oscillator (LO) and by further conversion from IF to baseband using carrier specific IF LOs, wherein as a controllable frequency offset is used as a part of the conversion from at least one of RF to IF and IF to baseband through the LOs; removing any controllable frequency offset from the baseband signal for the first and second carriers to produce representations of the received signals of the first and second carriers; deriving IQ imbalance parameters for each representation of the received signals of the first and second carriers using a least square estimate is described.

According to one or more embodiments disclosed and claimed herein, a user equipment to calculate in-phase (I) and quadrature (Q) imbalance (IQ imbalance) parameters from a received known signal, the user equipment comprising: a dual-carrier receiver operative to receive a known signal, modulated onto first and second radio frequency (RF) and generate a representation of the received known signal with using an introduced frequency offset; and an IQ imbalance parameter estimator circuit operative to receive the representation the received known signal thereof and to generate IQ imbalance parameters according to a least square estimate is described.

DETAILED DESCRIPTION

Figure 1:
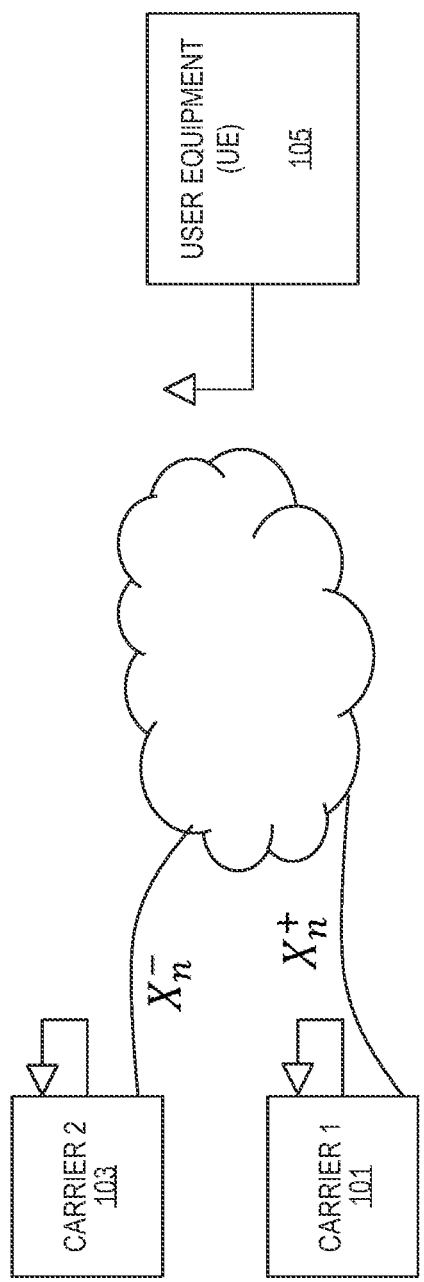
FIG. 1 illustrates the interaction between user equipment (UE) and wireless carriers.

FIG. 1 illustrates the interaction between user equipment (UE) and wireless carriers. In this illustration, carrier1 101 and carrier2 103 each transmit a wireless signal to the UE 105. Unfortunately, transmitted carrier signals are rarely, if ever, the same signal that is received by UE 105. Additionally, the UE 105 itself can introduce signal differences through IQ imbalance which, as detailed above, may come from imbalanced radio frequency (RF)/analog circuitry including, but not limited to, local oscillators (LOs), mixers, filters, analog-to-digital converters (ADCs), etc. RF/analog circuitry may be calibrated by controlling circuit parameters or the IQ imbalance may be compensated by digital signal processing inside digital baseband. Digital compensation of IQ imbalance has many advantages over analog calibration, for example, in principle, it can work with any radio since it does not require a special interface between the radio and digital baseband. A major benefit of IQ imbalance compensation is to relax the design requirement on IQ imbalance (or to improve the receiver performance, given the same radio).

Digital compensation of IQ imbalance consists of two steps: imbalance estimation and imbalance compensation. Through imbalance estimation the parameters related to IQ imbalance based on, for example, a known signal such as a pilot, test, or other expected signal are estimated. These estimates are then used by compensation logic or circuitry to minimize effects of IQ imbalance in received carrier signals. For radio downlinks (DLs), the test signal is generated inside of the user equipment (UE) and injected into the receiver. A pilot signal is generated by an eNodeB and received by the UE over-the-air. Pilot based IQ imbalance estimation is beneficial in that it is possible to avoid additional hardware (both radio and digital baseband) along with the associated interface.

For LTE DL, the pilot signal may be a reference symbol (RS) or a synchronization channel (SCH). The RS assists with the demodulation of a physical downlink shared channel (PD- SCH) and therefore RS is spread over time, frequency, and space. However, since RS is co-mingled with PDSCH within an orthogonal frequency-division multiplexing (OFDM) symbol (otherwise known as a "comb-type pilot"), it is difficult to utilize RS for IQ imbalance estimation. On the other hand, SCH is generally more favorable from the viewpoint of IQ imbalance estimation as it is separate from PDSCH (this is called a "block-type pilot") and the reception of SCH always precedes a PDSCH (since cell search is based on SCH).

Figure 2:
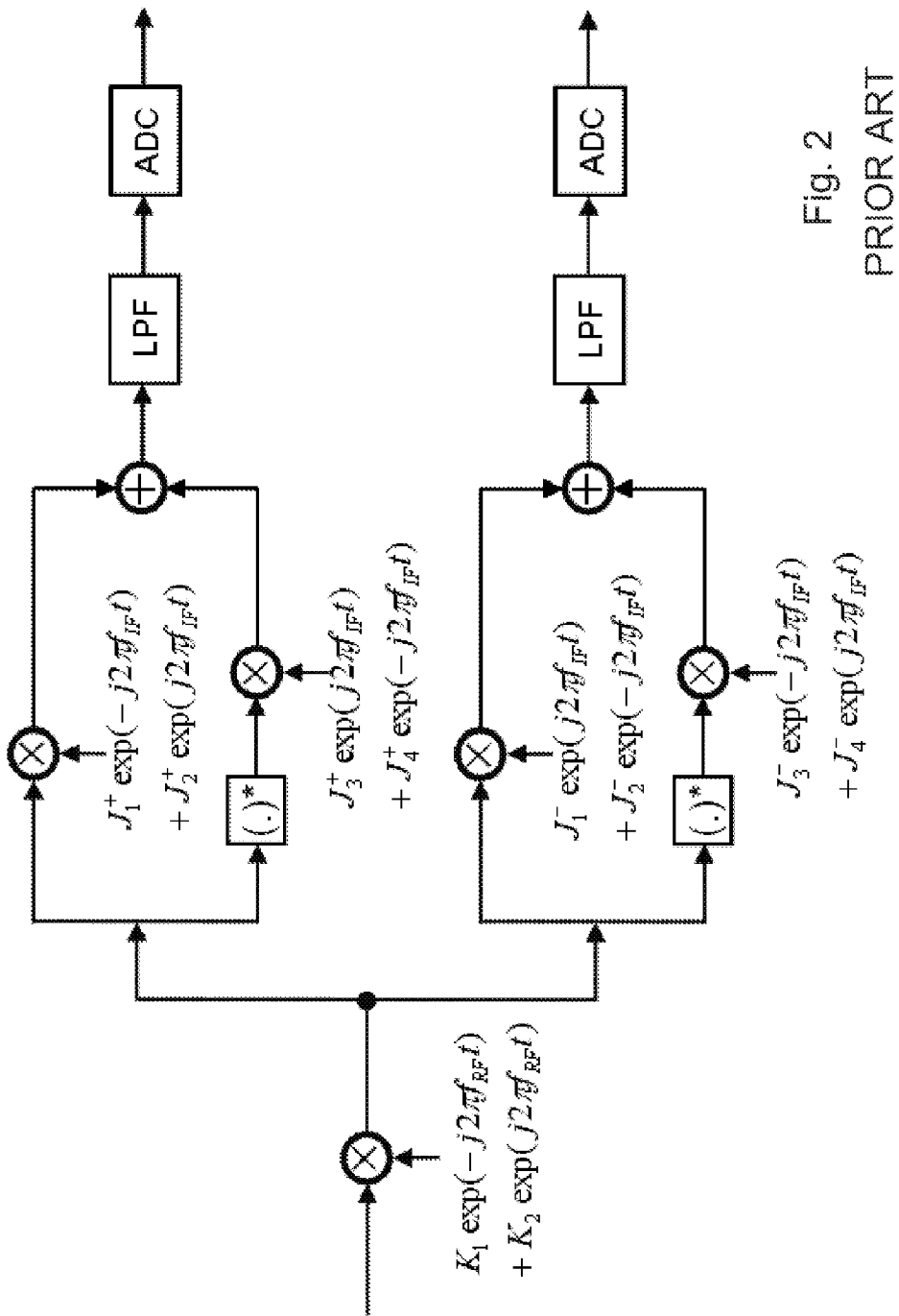
FIG. 2 illustrates a conventional double conversion receiver for dual-carrier reception.

A conventional double conversion receiver for dual-carrier reception is shown in FIG. 2. The IQ imbalance parameters denoted by $K_i$, $J_i^+$, and $J_i^-$ in this figure are generally complex numbers, which are determined by the gain and phase imbalance of in-phase and quadrature-phase. With respect to these variables and variables throughout this description, the superscript represents the carrier (+ is used for carrier 1 and − for carrier 2). If the radio is perfectly balanced, $K_1=J_1^+=J_1^-=1$, and $K_2=J_2^+=J_3^+=J_4^+=J_2^-=J_3^-=J_4^-=0$.

The J IQ imbalance parameters relating to IF mixing for the first carrier are defined as $J_1^+ = \frac{1}{4}(h_3 e^{-j\theta_3} + h_2 e^{-j\theta_2} + h_1 e^{-j\theta_1} + 1)$, $J_2^+ = \frac{1}{4}(h_3 e^{j\theta_3} - h_2 e^{j\theta_2} - h_1 e^{j\theta_1} + 1)$, $J_4^+ = \frac{1}{4}(h_3 e^{j\theta_3} - h_2 e^{j\theta_2} + h_1 e^{j\theta_1} - 1)$, and $J_3^+ = \frac{1}{4}(h_3 e^{j\theta_3} + h_2 e^{j\theta_2} - h_1 e^{j\theta_1} - 1)$.

The J IQ imbalance parameters for the second carrier are $J_1^- = \frac{1}{4}(h_3 e^{j\theta_3} + h_2 e^{j\theta_2} + h_1 e^{j\theta_1} + 1)$, $J_2^- = \frac{1}{4}(h_3 e^{j\theta_3} - h_2 e^{j\theta_2} - h_1 e^{j\theta_1} + 1)$, $J_4^- = \frac{1}{4}(h_3 e^{-j\theta_3} - h_2 e^{-j\theta_2} + h_1 e^{-j\theta_1} - 1)$, and $J_3^- = \frac{1}{4}(h_3 e^{-j\theta_3} + h_2 e^{-j\theta_2} - h_1 e^{-j\theta_1} - 1)$.

The gain imbalance of IF mixing is represented by $h_1$, $h_2$ and $h_3$, and the phase imbalance of IF mixing is represented by $\theta_1$, $\theta_2$ and $\theta_3$.

The K IQ imbalance parameters relating to RF mixing are defined as $K_1 = \frac{1}{2}(ge^{-j\phi} + 1)$, $K_2 = \frac{1}{2}(-ge^{j\phi} + 1)$.

In the K values, g and φ represent the gain and phase imbalance of RF mixing respectively.

Since digital compensation is performed after the OFDM processing of digital baseband, observing the baseband signal after OFDM provides a means for IQ imbalance estimation. An exemplary signal model (which does not include noise) for this is $$\begin{pmatrix} Y_n^+ \\ Y_{-n}^{+*} \\ Y_n^- \\ Y_{-n}^{-*} \end{pmatrix} = \begin{pmatrix} P_1^+ H_n^+ & P_2^+ H_{-n}^{+*} & P_3^+ H_n^- & P_4^+ H_{-n}^{-*} \\ P_2^{+*} H_n^+ & P_1^{+*} H_{-n}^{+*} & P_4^{+*} H_n^- & P_3^{+*} H_{-n}^{-*} \\ P_1^- H_n^+ & P_2^- H_{-n}^{+*} & P_3^- H_n^- & P_4^- H_{-n}^{-*} \\ P_2^{-*} H_n^+ & P_1^{-*} H_{-n}^{+*} & P_4^{-*} H_n^- & P_3^{-*} H_{-n}^{-*} \end{pmatrix} \begin{pmatrix} X_n^+ \\ X_{-n}^{+*} \\ X_n^- \\ X_{-n}^{-*} \end{pmatrix}, \quad (1)$$

where $Y_n^+$ (or $Y_n^-$) represents the received signal of the n-th subcarrier of the first (or second) carrier, $X_n^+$ (or $X_n^-$) represents the transmitted signal of the n-th subcarrier of the first (or second) carrier, $H_n^+$ (or $H_n^-$) represents the channel coefficient of the n-th subcarrier of the first (or second) carrier, and $P_i^+$ (or $P_i^-$) represents the IQ imbalance parameters. Note that $P_i^+$ (or $P_i^-$) are related to $K_i$, $J_i^+$ and $J_i^-$.

However, the estimation problem presented in equation (1) is under-determined, since the number of equations (four) is smaller than the number of unknowns (sixteen). Extending this exemplary system model in time and/or frequency may be accomplished by assuming identical channel coefficients and IQ imbalance parameters. Under that assumption, all four contiguous subcarriers experience the same channel and IQ imbalance and the frequency-domain extension of equation (1) can be expressed as $$\begin{pmatrix} Y_n^+ \\ Y_{n+1}^+ \\ Y_{n+2}^+ \\ Y_{n+3}^+ \end{pmatrix} = X_n \begin{pmatrix} P_1^+ H_n^+ \\ P_2^+ H_{-n}^{+*} \\ P_3^+ H_n^- \\ P_4^+ H_{-n}^{-*} \end{pmatrix}, \quad (2)$$

where $X_n$ is the signal transmitted to the receiver and is defined as $$X_n = \begin{pmatrix} X_n^+ & X_{-n}^{+*} & X_n^- & X_{-n}^{-*} \\ X_{n+1}^+ & X_{-(n+1)}^{+*} & X_{n+1}^- & X_{-(n+1)}^{-*} \\ X_{n+2}^+ & X_{-(n+2)}^{+*} & X_{n+2}^- & X_{-(n+2)}^{-*} \\ X_{n+3}^+ & X_{-(n+3)}^{+*} & X_{n+3}^- & X_{-(n+3)}^{-*} \end{pmatrix}. \quad (3)$$

Consequently, the least square estimate of $$\begin{pmatrix} P_1^+ H_n^+ \\ P_2^+ H_{-n}^{+*} \\ P_3^+ H_n^- \\ P_4^+ H_{-n}^{-*} \end{pmatrix} \quad (4)$$

is given as $$\begin{pmatrix} P_1^+ H_n^+ \\ P_2^+ H_{-n}^{+*} \\ P_3^+ H_n^- \\ P_4^+ H_{-n}^{-*} \end{pmatrix} = X_n^{-1} \begin{pmatrix} Y_n^+ \\ Y_{n+1}^+ \\ Y_{n+2}^+ \\ Y_{n+3}^+ \end{pmatrix}. \quad (5)$$

It is worth noting that this estimation is applicable only when $X_n$ is non-singular, i.e., the inverse exists. Moreover, with noise included in equation (1), the estimation error is proportional to the diagonal elements of $(X_n^H X_n)^{-1}$. However, the following discussion will assume the simpler variant of no noise for ease of understanding will detail the estimation of the first row of IQ imbalance matrix of equation (1). For the remaining rows, the least square estimates are obtained similarly. Once the IQ imbalance parameters are estimated, the imbalance compensation follows.

The performance of the digital compensation of IQ imbalance heavily depends on the imbalance estimation and, unfortunately, good estimation quality is not always guaranteed for several reasons. The major reason is that the known signal may not necessarily be optimized for the purpose of imbalance estimation.

For example, in the case of LTE DL, the SCH of each carrier is derived from the cell ID and the choice of cell ID is up to the operator's cell planning. Therefore, it is likely that two carriers of the same cell use the same cell ID, and thus, the same SCH. In this case, the first column of $X_n$ is the same as the third column, whereas the second column is the same as the fourth column. This implies that $X_n$ is rank-2 and thus singular. In other words, the estimation problem is still underdetermined.

Moreover, the time-domain extension does not help. Even when the observation for imbalance estimation is done jointly over Primary Synchronization Signal (PSS) and Secondary Synchronization Signal (SSS), it is still under-determined, since both PSS and SSS are derived from the same cell ID and thus $X_n$ is rank–2.

User Equipment

Figure 3:
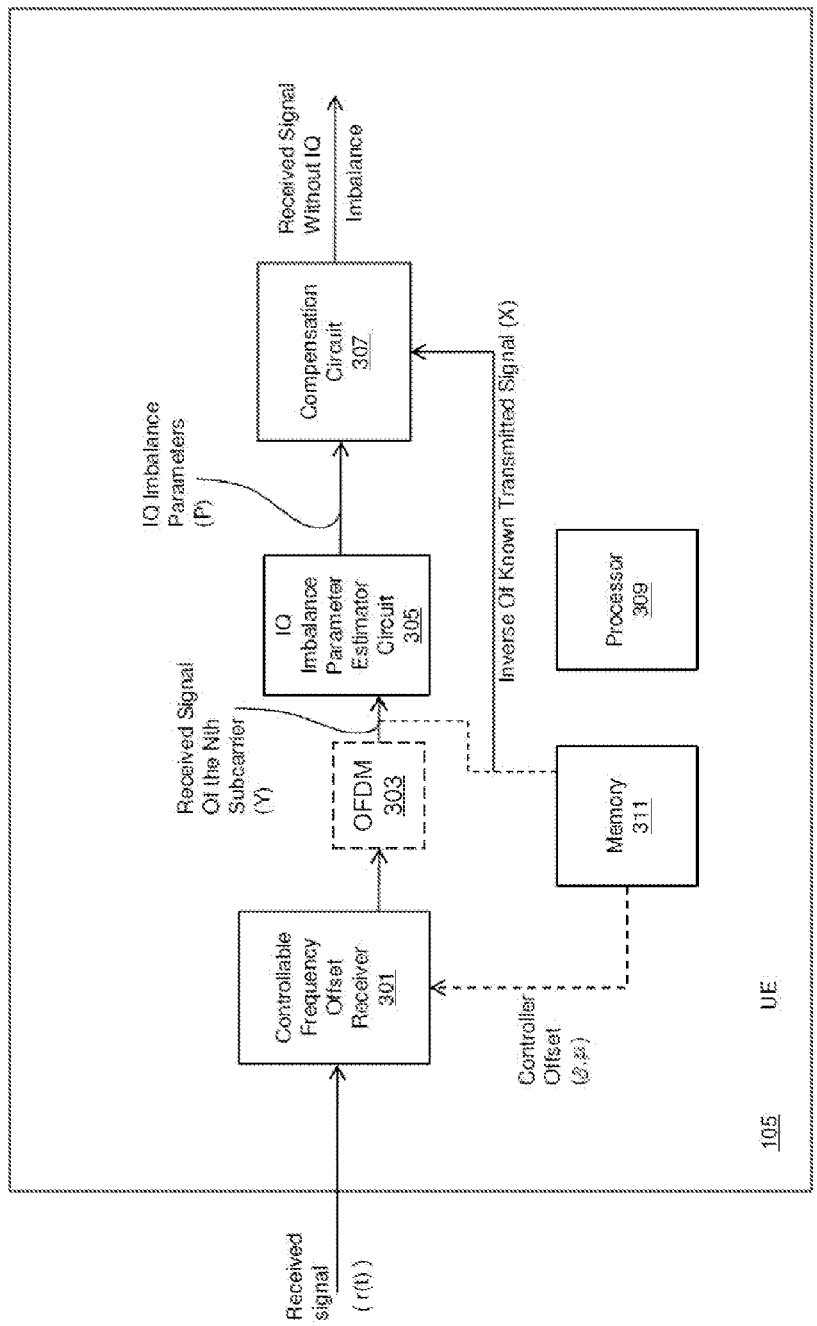
FIG. 3 illustrates an exemplary embodiment of at least a portion of the UE.

FIG. 3 illustrates an exemplary embodiment of at least a portion of the UE 105. This UE determines IQ imbalance parameters through the use of a conventional double conversion receiver for dual-carrier reception that introduces frequency offset in its RF LO and/or IF LO as will be detailed later. The output of this receiver 301 is evaluated, either directly or after some post processing depending upon the implementation, by IQ imbalance parameter estimator circuit 305 which generates the IQ imbalance parameters.

The UE 105 receives an RF signal, r(t), which is expressed as $$r(t) = Re\{r_1(t)e^{j2\pi(f_{RF}+f_{IF})t}\} + Re\{r_2(t)e^{j2\pi(f_{RF}-f_{IF})t}\}, \quad (6)$$

where $r_1(t)$ and $r_2(t)$ are the baseband signals modulated onto carrier1 and carrier2, respectively. Note that carrier1 and carrier2 have the center frequency of $(f_{RF}+f_{IF})$ and $(f_{RF}-f_{IF})$, respectively. That is, the intermediate frequency is selected to be half of the difference between the first and second carrier frequencies.

This RF signal is received by an antenna (not shown) and passed to a controllable frequency offset receiver 301. The details of this receiver 301 will be discussed in detail with respect to FIG. 4. As hinted at earlier, this receiver 301 introduces a controllable frequency offset into its RF LO and/or IF LO to avoid the estimation problem depicted earlier. Specifically, there is a shifting of the frequencies of the receivers LOs by a multiple, such as an integer multiple, of the subcarrier spacing of the carriers. In some embodiments, this introduced controllable frequency is compensated for after an ADC operation has been performed (e.g., using a digital mixer in digital frontend) so that the desired carrier does not experience much, if any, offset after IQ imbalance compensation.

Depending on the frequency shifts of RF LO and/or IF LO, it is possible to make the pilot matrix $(X_n)$ full-rank (non-singular) and estimate the IQ imbalance parameters, even when the same cell ID (or, equivalently, the same SCH) is used for all the CCs.

In some embodiments, the controllable frequency offset receiver 301 receives a controllable frequency offset, $\delta$, for the RF and IF LOs respectively from a memory 311. Of course, this offset may also be stored in the receiver 301. This controllable frequency offset is also be used in a digital mixer to cancel out the introduced offset according to some embodiments of the receiver 301.

The output of the receiver 301 depends on if it includes a digital mixer or not. If there is a digital mixer, then the output is the received signals of the subcarrier without the frequency offset. This is referenced as Y below. If there is not a digital mixer, then the output of the receiver 301 is the baseband signals of the carriers or y below. Instead of compensating for the frequency offset using a digital mixer, an OFDM processor 303 does the compensation in the frequency domain, i.e., after Fast Fourier Transform (FFT).

In either case, Y is fed into an IQ imbalance parameter estimator circuit 305 which generates IQ imbalance parameters (P). The details of this generation will follow.

A compensation circuit 307 takes in P and an inverse of a known transmitted signal X that is included in Y (or provided by memory 311) and generates an received signal without IQ imbalance. Many, if not all, of the above components are controlled by a processor 309. Additionally, while labeled as "circuit" in some embodiments the above are software routines running in the processor or some other sort of logic.

Figure 4:
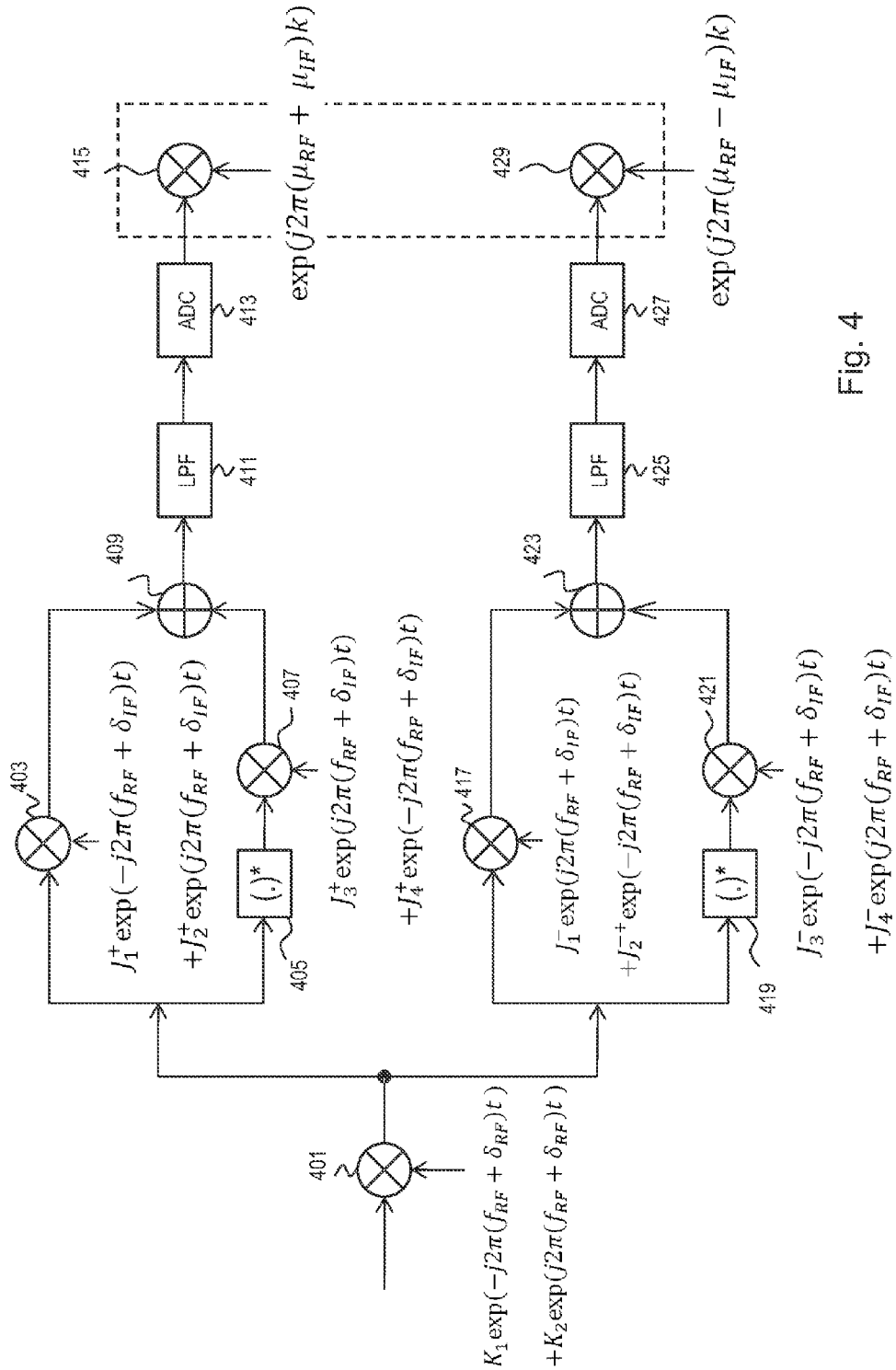
FIG. 4 details of an exemplary receiver.

FIG. 4 illustrates an exemplary embodiment of a double conversion receiver for dual-carrier reception that uses a controllable frequency offset to assist in the determination of IQ imbalance parameters. This known RF signal is fed into a RF mixer 401 along with a frequency translated version of the known signal, RF LO, that includes a controllable frequency offset ($\delta_{RF}$). The RF LO is represented as $K_1 e^{-j2\pi(f_{RF}+\delta_{RF})t} + K_2 e^{-j2\pi(f_{RF}+\delta_{RF})t}$. In some embodiments, $\delta_{RF}$ is an integer such as 4 or 5.

The output of this RF Mixer 401 is passed to mixers which use carrier specific IF LOs. In the figure, the "top" is associated with carrier1 and includes two IF mixers 403 and 407, a complex conjugate creator 405, and an adder 409. Mixer 403 mixes the frequency translated version of the known signal with an IF LO $J_1^+ e^{(-j2\pi(f_{IF}+\delta_{IF})t)} + J_2^+ e^{(j2\pi(f_{IF}+\delta_{IF})t)}$, where $$J_1^+ = \frac{1}{4}(h_3 e^{-j\theta_3} + h_2 e^{-j\theta_2} + h_1 e^{-j\theta_1} + 1) \text{ and}$$

$$J_2^+ = \frac{1}{4}(h_3 e^{j\theta_3} - h_2 e^{j\theta_2} - h_1 e^{j\theta_1} + 1).$$

In some embodiments, $\delta_{IF}$ is an integer such as 2 or 3. The output of mixer 401 is also input into a complex conjugate creatoer 405 whose output is fed into mixer 407 along with another IF LO $J_3^+ e^{(j2\pi(f_{IF}+\delta_{IF})t)} + J_4^+ e^{(-j2\pi(f_{IF}+\delta_{IF})t)}$, where $$J_3^+ = \frac{1}{4}(h_3 e^{j\theta_3} + h_2 e^{j\theta_2} - h_1 e^{j\theta_1} - 1) \text{ and}$$

$$J_4^+ = \frac{1}{4}(h_3 e^{j\theta_3} - h_2 e^{j\theta_2} + h_1 e^{j\theta_1} - 1).$$

The outputs of IF mixers 403 and 407 are fed into a low pass filter (LPF) 411 creating a baseband signal (y) for the first carrier. An analog-to-digital converter (ADC) 413 receives the baseband signal and converts it to a digital baseband signal.

In some embodiments, the receiver will also have digital front end to remove or minimize the effects of the introduced offset from the digital baseband signal. The digital front includes a mixer 415 to take that digital signal and apply an LO to it. In some embodiments, the LO applied be the mixer 415 is expressed as $e^{(j2\pi(\mu_{RF}+\mu_{IF})k)}$, where $\mu_{RF}$ and $\mu_{IF}$ represent the frequency offset of the digital mixer and these frequency offset values are given as integer multiples of the subcarrier spacing. For example, in some embodiments, $\mu_{RF}=\delta_{RF}T$ and $\mu_{IF}=\delta_{IF}T$, where T is the duration of an OFDM symbol excluding the cyclic prefix, i.e., an inverse of subcarrier spacing. In LTE, T is 15 kHz. The output of this mixer 415 is the received signal of the nth subcarrier of carrier1 or $Y_n^+$.

In other embodiments, instead of a mixer, OFDM processing unit adjusts the subcarrier index by the same amount in frequency domain, i.e., after FFT. The OFDM processing unit may be internal or external to the receiver 301.

The second carrier, carrier2, also receives the output of RF mixer 401. In the figure this is the "bottom" path and it includes two IF mixers 417 and 421, a complex conjugate creator 419, and an adder 423. Mixer 417 mixes the frequency translated version of the known signal with an IF LO $J_1^- e^{(j2\pi(f_{IF}+\delta_{IF})t)} + J_2^- e^{(-j2\pi(f_{IF}+\delta_{IF})t)}$, where $$J_1^- = \frac{1}{4}(h_3 e^{j\theta_3} + h_2 e^{j\theta_2} + h_1 e^{j\theta_1} + 1) \text{ and}$$

$$J_2^- = \frac{1}{4}(h_3 e^{j\theta_3} - h_2 e^{j\theta_2} - h_1 e^{j\theta_1} + 1).$$

In this signal, the gain imbalance of IF mixing is represented by $h_1$, $h_2$ and $h_3$, and the phase imbalance of IF mixing is represented by $\theta_1$, $\theta_2$ and $\theta_3$. The output of mixer 401 is also input into a complex conjugate creator 419 whose output is fed into mixer 421 along with another IF LO $J_3^- e^{(-j2\pi(f_{IF}+\delta_{IF})t)} + J_4^- e^{(j2\pi(f_{IF}+\delta_{IF})t)}$, where $$J_3^- = \frac{1}{4}(h_3 e^{-j\theta_3} + h_2 e^{-j\theta_2} - h_1 e^{-j\theta_1} - 1) \text{ and}$$

$$J_4^- = \frac{1}{4}(h_3 e^{-j\theta_3} - h_2 e^{-j\theta_2} + h_1 e^{-j\theta_1} - 1).$$

The outputs of IF mixers 417 and 421 are fed into an adder 423 which then passes a value to a low pass filter (LPF) 425 creating a baseband signal (y) for the second carrier. An analog-to-digital converter (ADC) 427 receives the baseband signal and converts it to a digital signal.

In some embodiments, the receiver will have digital front end to remove or minimize the effects of the introduced offset from the digital baseband signal for the second carrier. The digital front includes a mixer 429 to take that digital signal and apply an LO to it. In some embodiments, the LO applied be the mixer 429 is expressed as $e^{(j2\pi(\mu_{RF}-\mu_{IF})k)}$, The output of this mixer 429 is the received signal of the nth subcarrier of carrier2 or $Y_N^-$.

In other embodiments, instead of a mixer, OFDM processing unit adjusts the subcarrier index by the same amount in frequency domain, i.e., after FFT. The OFDM processing unit may be internal or external to the receiver 301.

Assuming that digital mixer or OFDM processing unit compensates for the frequency offset completely, the signal model corresponding to the receiver in FIG. 3 is given as $$\begin{pmatrix} Y_n^+ \\ Y_{-(n-(2\mu_{RF}+2\mu_{IF}))}^{+*} \\ Y_{n-2\mu_{IF}}^- \\ Y_{-(n-2\mu_{RF})}^{-*} \end{pmatrix} = \quad (7)$$

$$\begin{pmatrix} P_1^+ H_n^+ & P_2^+ H_{-(n-(2\mu_{RF}+2\mu_{IF}))}^{+*} & P_3^+ H_{n-2\mu_{IF}}^- & P_4^+ H_{-(n-2\mu_{RF})}^{-*} \\ P_2^{+*} H_n^+ & P_1^{+*} H_{-(n-(2\mu_{RF}+2\mu_{IF}))}^{+*} & P_4^{+*} H_{n-2\mu_{IF}}^- & P_3^{+*} H_{-(n-2\mu_{RF})}^{-*} \\ P_1^- H_n^+ & P_2^- H_{-(n-(2\mu_{RF}+2\mu_{IF}))}^{+*} & P_3^- H_{n-2\mu_{IF}}^- & P_4^- H_{-(n-2\mu_{RF})}^{-*} \\ P_2^{-*} H_n^+ & P_1^{-*} H_{-(n-(2\mu_{RF}+2\mu_{IF}))}^{+*} & P_4^{-*} H_{n-2\mu_{IF}}^- & P_3^{-*} H_{-(n-2\mu_{RF})}^{-*} \end{pmatrix} \times$$

$$\begin{pmatrix} X_n^+ \\ X_{-(n-(2\mu_{RF}+2\mu_{IF}))}^{+*} \\ X_{n-2\mu_{IF}}^- \\ X_{-(n-2\mu_{RF})}^{-*} \end{pmatrix}.$$

If we assume that four contiguous subcarriers experience the same channel and IQ imbalance, the frequency-domain extension of (7) can be expressed as $$\begin{pmatrix} Y_n^+ \\ Y_{-(n-(2\mu_{RF}+2\mu_{IF}))}^{+*} \\ Y_{n-2\mu_{IF}}^- \\ Y_{-(n-2\mu_{RF})}^{-*} \end{pmatrix} = X_n' \begin{pmatrix} P_1^+ H_n^+ \\ P_2^+ H_{-(n-(2\mu_{RF}+2\mu_{IF}))}^{+*} \\ P_3^+ H_{n-2\mu_{IF}}^- \\ P_4^+ H_{-(n-2\mu_{RF})}^{-*} \end{pmatrix}, \quad (8)$$

where $X'_n$ is the pilot matrix defined as $$X'_n = \begin{pmatrix} X_n^+ & X_{-(n-(2\mu_{RF}+2\mu_{IF}))}^{+*} & X_{n-2\mu_{IF}}^- & X_{-(n-2\mu_{RF})}^{-*} \\ X_{n+1}^+ & X_{-((n+1)-(2\mu_{RF}+2\mu_{IF}))}^{+*} & X_{(n+1)-2\mu_{IF}}^- & X_{-((n+1)-2\mu_{RF})}^{-*} \\ X_{n+2}^+ & X_{-((n+2)-(2\mu_{RF}+2\mu_{IF}))}^{+*} & X_{(n+2)-2\mu_{IF}}^- & X_{-((n+2)-2\mu_{RF})}^{-*} \\ X_{n+3}^+ & X_{-((n+3)-(2\mu_{RF}+2\mu_{IF}))}^{+*} & X_{(n+3)-2\mu_{IF}}^- & X_{-((n+3)-2\mu_{RF})}^{-*} \end{pmatrix}. \quad (9)$$

Consequently, the least square estimate of $$\begin{pmatrix} P_1^+ H_n^+ \\ P_2^+ H_{-(n-(2\mu_{RF}+2\mu_{IF}))}^{+*} \\ P_3^+ H_{n-2\mu_{IF}}^- \\ P_4^+ H_{-(n-2\mu_{RF})}^{-*} \end{pmatrix} \quad (10)$$

is given as $$\begin{pmatrix} P_1^+ H_n^+ \\ P_2^+ H_{-(n-(2\mu_{RF}+2\mu_{IF}))}^{+*} \\ P_3^+ H_{n-2\mu_{IF}}^- \\ P_4^+ H_{-(n-2\mu_{RF})}^{-*} \end{pmatrix} = X_n'^{-1} \begin{pmatrix} Y_n^+ \\ Y_{-(n-(2\mu_{RF}+2\mu_{IF}))}^{+*} \\ Y_{n-2\mu_{IF}}^- \\ Y_{-(n-2\mu_{RF})}^{-*} \end{pmatrix}. \quad (11)$$

Accordingly, the IQ imbalance parameter estimator circuit 305 can find the IQ imbalance parameters using the inverse of the known signal and the output of the controllable frequency offset receiver 301.

We note that $X'_n$ can be non-singular (if both $\mu_{RF}$ and $\mu_{IF}$ are non-zero), even when the two carriers use the same SCH, i.e., $X_n^+ = X_n^-$. FIG. 4 shows the estimation error for LTE DL, when PSS is used as the pilot signal for both the carriers. As illustrated, the controllable frequency offset makes the estimation error factor comparable to that for two carriers with different cell IDs.

Exemplary Methods

Figure 5:
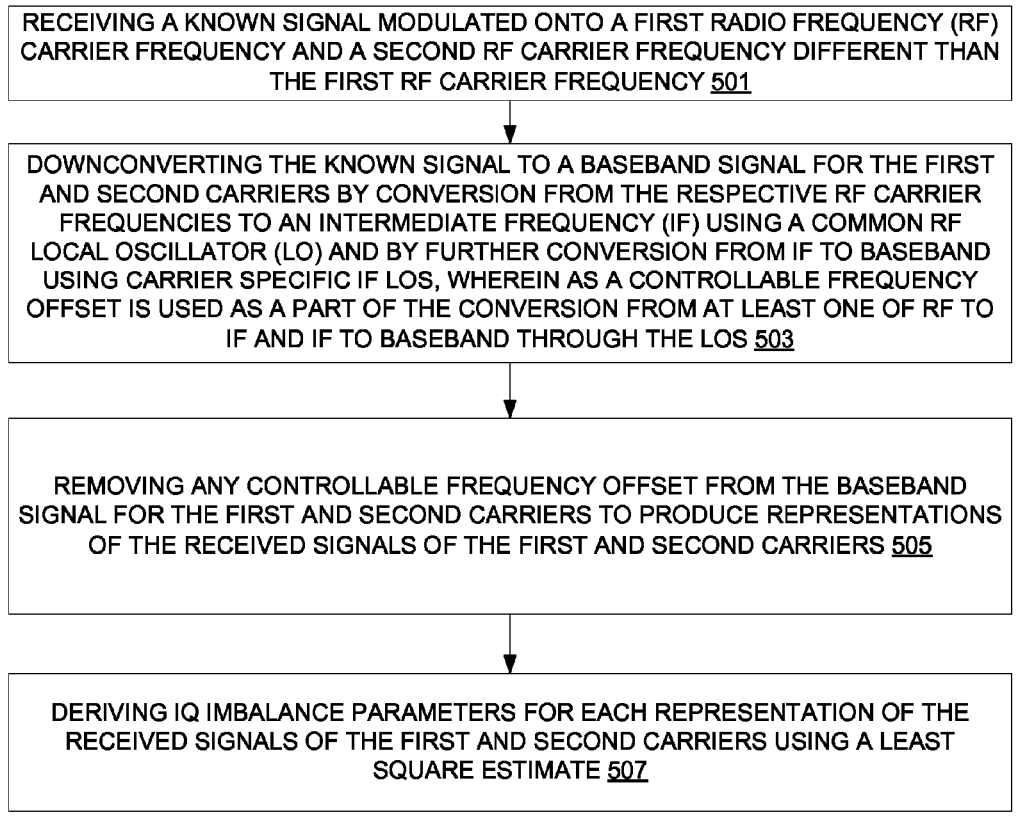
FIG. 5 illustrates an exemplary method of using a dual-carrier receiver and controllable frequency offset to determine IQ imbalance parameters.

FIG. 5 illustrates an exemplary method of using a dual-carrier receiver and controllable frequency offset to determine IQ imbalance parameters. At 501, a known signal, such as a pilot or test signal, modulated onto a first radio frequency (RF) carrier frequency and a second RF carrier frequency different than the first RF carrier frequency is received. In terms of what has been described above, r(t) is received.

The known signal is downconverted to a baseband signal for the first and second carriers by conversion from the respective RF carrier frequencies to an intermediate frequency (IF) using a common RF local oscillator (LO) and by further conversion from IF to baseband using carrier specific IF LOs, wherein as a controllable frequency offset is used as a part of the conversion from at least one of RF to IF and IF to baseband through the LOs at 503. Related to the earlier discussion, a baseband signal, y, is created in this step.

Any introduced controllable frequency offset is removed from the baseband signal for the first and second carriers to produce representations of the received signals of the first and second carriers at 505. At this point, the signal will be Y described above.

IQ imbalance parameters are derived for each representation of the received signals Y of the first and second carriers using a least square estimate at 507. This is the application of equation (6) above.

Figure 6:
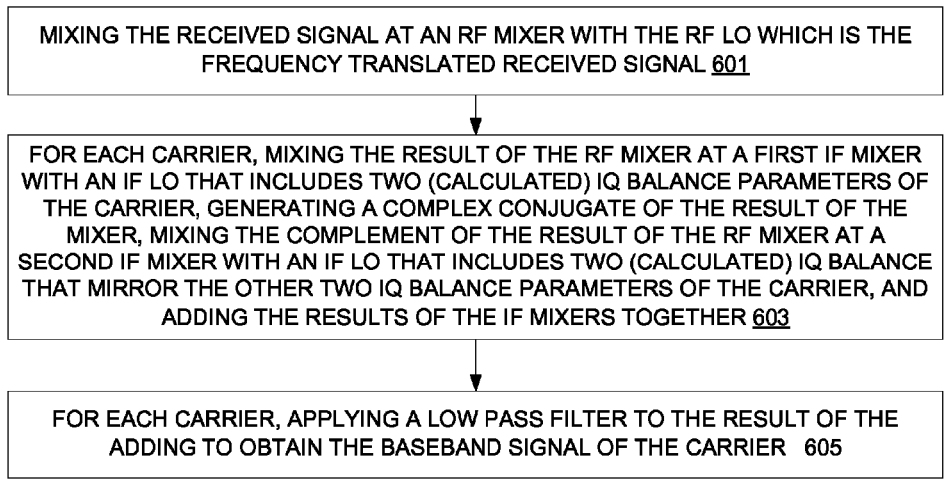
FIG. 6 illustrates an exemplary embodiment of a method of downconverting to a baseband signal.

FIG. 6 illustrates an exemplary embodiment of a method of downconverting to a baseband signal. At 601, the received signal is mixed at an RF mixer (such as mixer 401) with a RF LO which is the frequency translated received signal defined above and illustrated in FIG. 4.

The output of this mixer is received at IF mixing stages for both carriers at processed at 603. For each carrier, the result of the RF mixer is mixed at a first IF mixer (i.e., 403) with an IF LO that includes two IQ imbalance parameters of the carrier. The result of the RF mixer is also run through a complex conjugate unit (i.e., 405) to generate a complex conjugate of the result. This complex conjugate is mixed at a second mixer (i.e., 407) with an IF LO that includes the mirror of the other two IQ balance parameters of the carrier. The results of both IF mixers are added together by an adder (i.e., 409).

For each carrier, a low pass filter is applied to the result of the addition to obtain a baseband signal of the carrier at 605.

Exemplary Variants

As discussed earlier, in some embodiments, a digital mixer of a digital frontend is used to remove the introduced frequency offset. In other embodiments, instead of compensating for the frequency offset using digital mixer, the OFDM processing of digital baseband adjusts the subcarrier index by the same amount in frequency domain, i.e., after FFT.

One potential issue of introducing frequency offset is the impact of DC offset of the IF mixing stage. Since DC offset is placed at a data subcarrier of desired signal, and not at a null subcarrier, the frequency offset of IF LO may affect the receiver performance. However, the DC offset problem should not be as serious as that for a direct conversion receiver (DCR), since it comes from IF mixing stage (as opposed to RF mixing stage in the case of DCR). Furthermore, it is possible to mitigate the impact of DC offset by doing one of the following. First, shift RF LO by the same amount as the IF LO (in the same/opposite direction). For example, if $\mu_{RF} = \mu_{IF}$, one of the carriers does not experience any DC offset (while the other carrier still experiences DC offset). Likewise, if $\mu_{RF} = -\mu_{IF}$, the other carrier does not experience any DC offset. Second, introduce the frequency offset in the RF LO and/or IF LO, as described earlier, during the reception of SCH. Once the IQ imbalance parameters are estimated using SCH, remove the frequency offsets of LOs ($\mu_{RF} = \mu_{IF} = 0$) and the receiver works like conventional receiver in FIG. 2, during the reception of PDSCH. In general, IQ imbalance keeps almost constant while the frequency offset of LOs are changed (since it is relatively small shift, e.g., a few subcarrier spacings).

If error correction codes such as Turbo codes and LDPC codes are applied, the reliability of all data subcarriers is calculated and provided to the decoder. By considering the reliability of data subcarriers (or a set of data subcarriers) perturbed by the DC offset (due to the introduced frequency offset), it is possible to mitigate the impact of DC offset on the receiver performance. For example, the log-likelihood ratio (LLR) of each data subcarrier can be used as the measure of reliability. By modeling the DC offset as unknown (random) variable, the LLR of the data subcarriers around DC offset is closer to zero than if there is no DC offset. Therefore, the data subcarriers perturbed by DC offset contribute less to the decoding process and they can be recovered by the rest of data subcarriers.

The introduction of different frequency offsets may lead to a different estimation error factor. Consequently, it is possible to control the frequency offset to improve the estimation accuracy of a certain part of user bandwidth. This is useful especially when a certain part of user bandwidth experiences frequency-dependent IQ imbalance and thus it is impossible to estimate the IQ imbalance parameters by averaging them over the whole bandwidth.

Figure 7:
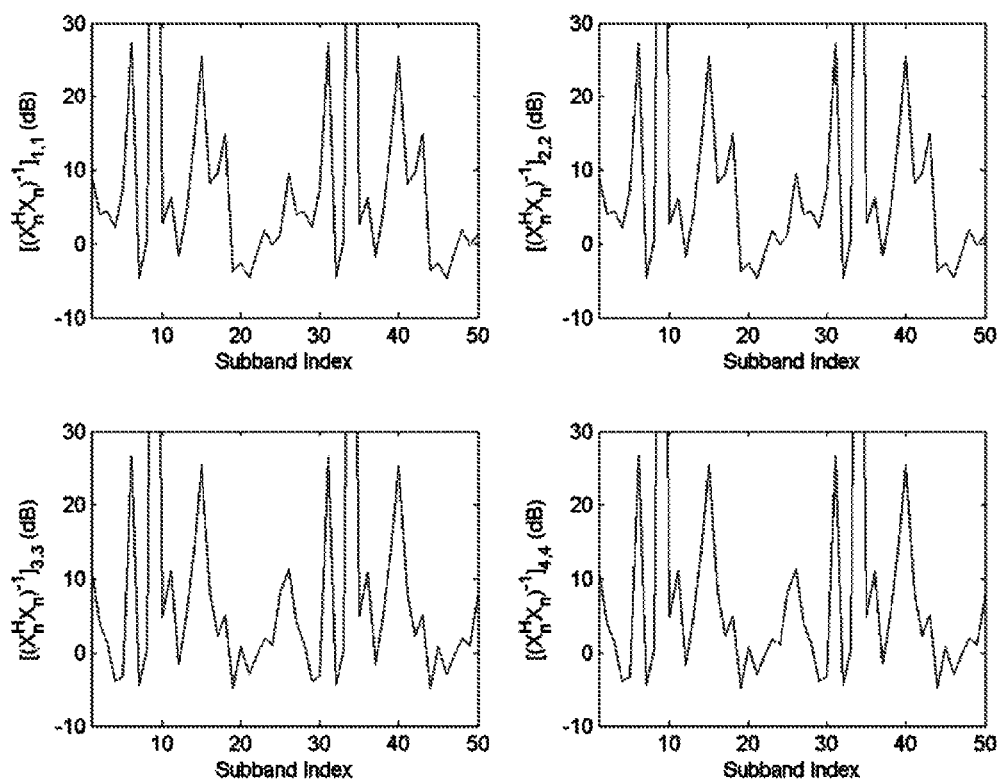
FIG. 7 illustrates IQ imbalance estimation factor with different cell IDs.

FIG. 7 illustrates IQ imbalance estimation factor with different cell IDs. This shows shows the estimation error factor for LTE DL, when PSS is used as the pilot signal.

Figure 8:
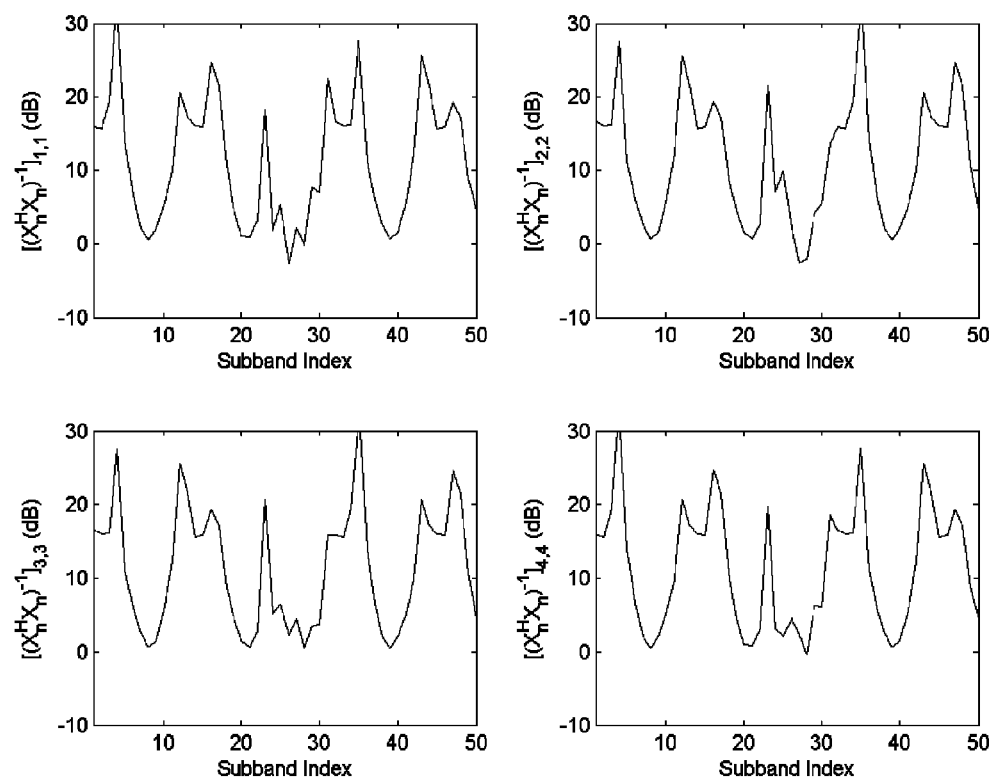
FIG. 8 illustrates IQ imbalance estimation error factor with the same cell ID and controllable frequency offset.

FIG. 8 illustrates IQ imbalance estimation error factor with the same cell ID and controllable frequency offset. This shows the estimation error for LTE DL, when PSS is used as the pilot signal for both the carriers. It is shown that the controllable frequency offset makes the estimation error factor comparable to that for two carriers with different cell IDs.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for determining in-phase (I) and Quadrature (Q) imbalance (IQ imbalance) parameters based on a known signal in a dual-carrier receiver using at least one controllable frequency offset, the method comprising:

receiving a known signal modulated onto a first radio frequency (RF) carrier frequency and a second RF carrier frequency different than the first RF carrier frequency;

downconverting the known signal to a baseband signal for the first and second carriers by conversion from the respective RF carrier frequencies to an intermediate frequency (IF) using an RF local oscillator (LO) and by further conversion from IF to baseband using carrier specific IF LOs, wherein a controllable frequency offset is used as a part of the conversion from at least one of RF to IF and IF to baseband through the LOs;

removing any controllable frequency offset from the baseband signal for the first and second carriers to produce representations of the received signals of the first and second carriers; and deriving IQ imbalance parameters for each representation of the received signals of the first and second carriers using a least square estimate.

2. The method of claim 1, wherein the controllable frequency offset is introduced into the conversion from RF to IF using the RF LO.

3. The method of claim 1, wherein the controllable frequency offset is introduced into the conversion from IF to baseband using an IF LO of the carrier specific IF LOs.

4. The method of claim 1, wherein the controllable frequency offset is introduced into the conversion from RF to IF using the RF LO, and IF to baseband using an IF LO of the carrier specific IF LOs.

5. The method of claim 4, wherein the controllable frequency offset is the same for the RF LO and IF LO functions.

6. The method of claim 1, wherein the controllable frequency offset is a non-zero value when the known signal is a synchronization (SCH) signal.

7. The method of claim 6, wherein the controllable frequency offset is zero when the known signal is a physical downlink shared channel (PDSCH) signal.

8. The method of claim 1, wherein the controllable frequency offset is removed using a digital front end comprising a mixer that receives a digital mixer LO including a frequency offset that is an integer multiple of any introduced controllable frequency offset.

9. The method of claim 1, wherein the controllable frequency offset is removed using orthogonal frequency-division multiplexing (OFDM).

10. The method of claim 1, wherein the known signal is a pilot signal received by the dual-carrier receiver over-the-air.

11. The method of claim 1, wherein the known signal is a test signal stored inside of the user equipment that houses the dual-carrier receiver.

12. A user equipment to calculate in-phase (I) and quadrature (Q) imbalance (IQ imbalance) parameters from a received known signal, the user equipment comprising:

a dual-carrier receiver operative to receive a known signal, modulated onto a first and a second radio frequency (RF) and generate a representation of the received known signal with using an introduced frequency offset;

an IQ imbalance parameter estimator circuit operative to receive the representation of the received known signal and to generate IQ imbalance parameters according to a least square estimate; and a digital front end operative to remove any frequency offset of a RF or IF local oscillator (LO).

13. The user equipment of claim 12, wherein the dual-carrier receiver comprises:

a RF mixer operative to receive the known signal and mix the known signal with a RF LO to produce a first result;

a first intermediate frequency (IF) mixing stage including,
a first IF mixer operative to receive the first result from the RF mixer and mix the first result with a first IF LO to generate an output,
a first complex conjugate unit operative to receive the first result from the RF mixer and generate a complex conjugate of the first result,
a second IF mixer operative to receive the complex conjugate of the first result from the first complex conjugate unit and mix the complex conjugate of the first result with a second IF LO to generate an output,
an first adder operative to add the outputs of the first and second IF mixers;

a first low pass filter operative to receive the added outputs of the first and second mixers and generate a baseband representation of the known signal;

a second IF mixing stage including,
a third IF mixer operative to receive the first result from the RF mixer and mix the first result with a third IF LO to generate an output,
a second complex conjugate unit operative to receive the first result from the RF mixer and generate a second complex conjugate of the first result,
a fourth IF mixer operative to receive the second complex conjugate of the first result from the second complex conjugate unit and mix the second complex conjugate of the first result with a fourth IF LO to generate an output,
an second adder operative to add the outputs of the third and fourth IF mixers; and a second low pass filter operative to receive the added outputs of the third and fourth IF mixers and generate a baseband representation of the known signal;

wherein at least one of the RF or IF LOs includes an frequency offset.

14. The user equipment of claim 12, further comprising:
orthogonal frequency-division multiplexing (OFDM) circuitry operative to remove any frequency offset of a RF or IF LO.

15. The user equipment of claim 12, further comprising:
memory to store the known signal.

16. The user equipment of claim 12, further comprising:
memory to store the frequency offsets of the RF or IF LOs.

* * * * *